United States Patent [19]

Yamamura et al.

[11] Patent Number: 4,828,695

[45] Date of Patent: May 9, 1989

[54] PACKAGING MATERIAL FOR HIGH PRESSURE LIQUID CHROMATOGRAPHY AND METHOD OF MAKING THE SAME

[75] Inventors: Ryuji Yamamura; Mikio Tsuboi; Keishi Kitagawa; Masaru Abe, all of Kyoto, Japan

[73] Assignee: Yamamura Chemical Laboratories, Co., Ltd., Kyoto, Japan

[21] Appl. No.: 154,581

[22] Filed: Feb. 10, 1988

[30] Foreign Application Priority Data

Feb. 26, 1987 [JP] Japan .................................. 62-44445

[51] Int. Cl.$^4$ ............................................ B01D 15/08
[52] U.S. Cl. .................................. 210/198.2; 210/635; 210/656; 210/502.1; 428/403; 428/405; 428/406; 428/407; 502/401; 502/439
[58] Field of Search ...................... 210/656, 502.1, 635, 210/659, 198.2; 428/403, 404, 405, 406, 407; 261/DIG. 72; 435/180, 181; 502/401, 407, 439

[56] References Cited

U.S. PATENT DOCUMENTS 4,314,032 2/1982 Murayama et al. ................. 210/656
4,724,207 2/1988 Hoo et al. ............................ 210/656

Primary Examiner—Goerge F. Lesmes
Assistant Examiner—James B. Monroe

[57] ABSTRACT

A novel packing material suitable for high pressure liquid chromatography comprising the chemically bonded, crosslinked reaction product of porous inorganic particles, with an organic silane compound having epoxy groups on the surface of the particles, and then with polyvinyl alcohol, in which the hydroxyl groups of the polyvinyl alcohol and the epoxy groups on the silane moieties react to form ether bonds, which cover almost or almost completely the residual silica hydroxyl groups on the surface of the support.

9 Claims, 4 Drawing Sheets pH 12.0 pH 7.0 pH 12.0

PACKAGING MATERIAL FOR HIGH PRESSURE LIQUID CHROMATOGRAPHY AND METHOD OF MAKING THE SAME

FIELD OF THE INVENTION

This invention relates to a novel packing material for high pressure liquid chromatography, and more particularly, relates to a support for analysis and/or separation of solute, by which hydrophilic compounds such as proteins, alcohols, saccharides, glycoproteins and the like in aqueous solution are analyzed and/or separated with an improved selectivity over a wide applicable range of the pH.

BACKGROUND OF THE INVENTION

According to conventional high pressure liquid chromatography (HPLC), packing materials with silica gel as support have been generally employed. The packing materials in which one or more organic functional groups are joined on the surface of the silica gel have various uses about many fields of chemistry. Such packing materials are in low absorption and have high resolving power, but only they can be applied in the narrow pH range, generally between pH 2 and 8.

In the process of producing the packing materials, silica hydroxyl groups are not reacted perfectly with the functional groups of an additive. As the result, some residual silica hydroxyl groups remain on the surface of the silica gel. In the case of analysis of biological sample such as proteins, a certain kind of solute is strongly adsorbed and retained in the packing material, thus the separating ability of the material is insufficient from the chromatographic standpoint.

For this reason, Japanese Patent Open Publication No. 5941/80 has described that an organic silane compound with epoxy groups as end groups is bound to the surface of silica gel, which is further copolymerized with an organic compound having other epoxy groups. Japanese Patent Open Publication No. 93043/81 has shown that an organic silane compound whose end groups are epoxy groups is bound to the surface of inorganic particles e.g. silica gel, and then mono-, di- or trisaccharide is bound chemically to the epoxy groups on the silane moieties, thereby the influence of residual silica hydroxyl groups is eliminated more and more. According to Japanese Patent Open Publication No. 5941/80 or No. 93043/81, the applicable range of the pH is not very wide because dissolution of the packing material begins to occur from the pH of about 10. It is assumed that the silica hydroxyl groups unreacted still remain from the result of polymerization degree of the organic compound added and other reasons.

Recently, since the applicable range of to be analyzed substances has became wider and wider, an organic support made from one or more synthetic resins have also been proposed, as described in Japanese Patent Open Publications No.76989/77, No.106357/80 and No.60261/82. The organic support is excellent in resistance against alkali and acid, but it is weak in mechanical strength. As the organic support also has a hard problem in swell, contraction and the like by addition of solvent and then remarkably lowers the column efficiency of HPLC, it is impossible to apply the support to new analytical fields.

SUMMARY OF THE INVENTION

This invention provides a novel packing material for HPLC in order to analyze and/or separate hydrophilic compounds. The packing material comprisies the chemically bound, crosslinked reaction product of inorganic particles, with an organic silane compound having epoxy groups, and then with polyvinyl alcohol. The term "crosslinked" means that the hydroxyl groups of polyvinyl alcohol and the epoxy groups on the silane moieties react to form ether bonds. The packing material according to the invention may be usually employed to analyze and/or separate hydrophilic compounds such as proteins, alcohols, saccharides, glycoproteins and the like in aqueous solution with improved selectivity over a wide applicable range of the pH.

It is therefore an object of the invention to provide a novel packing material for HPLC in order to analyze and/or separate hydrophilic compounds.

It is another object of the invention to provide a novel packing material for analysis and/or separation of hydrophilic compounds with improved selectivity.

It is still another object of the invention to provide a novel packing material for analysis and/or separation of hydrophilic compounds over a wide applicable range of the pH.

It is yet object of the invention to provide a method of making a packing material for analysis and/or separation of hydrophilic compounds.

It is still another object of the invention to provide a novel packing material for separation of hydrophilic compounds such as proteins, alcohols, saccharides, glycoproteins and the like in aqueous solution with improved selectivity over a wide range of the applicable pH.

It is yet object of the invention to provide a method of making a packing material for analysis and/or separation of hydrophilic compounds.

It is still another object of the invention to provide a chromatographic column suitable for HPLC packed with a novel packing material.

These and other objects, features and advantages of the invention will become more apparent to those skilled in the art from the following description.

DESCRIPTION OF THE INVENTION

Figure 1:
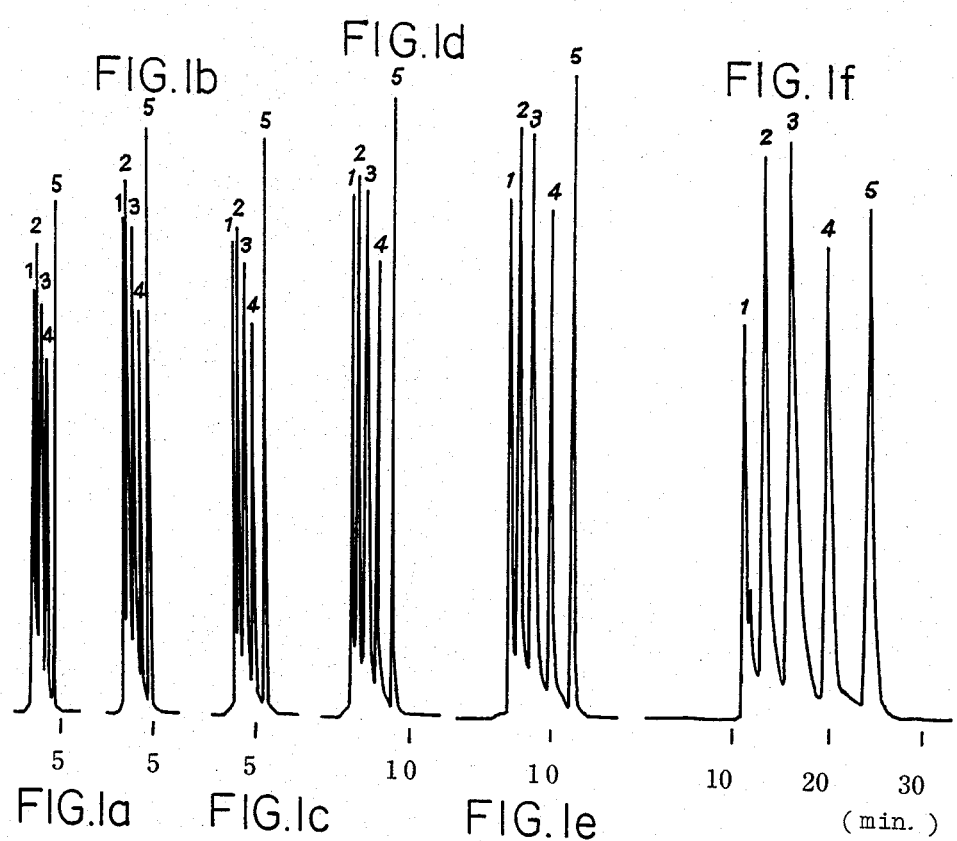
FIGS. 1(1) to (6) are separation chromatrograms showing resolution of a standard protein sample at each flow rate using a column packed with the support according to the invention.

The packing material according to the invention is conveniently prepared in accordance with the following steps:

reacting porous inorganic particles having an average particle diameter of about 1 to about 1000 microns, a surface area of about 1 to about 800 square meters per gram and an average pore size of about 10 to about 4000 Angstrom units, with an organic silane compound having epoxy groups, whereby the silane compound is bound chemically to the surface of the particles without ring-opening of the epoxy groups.

and then reacting the resultant product with polyvinyl alcohol having an average molecular weight of about 100 to about 200000, whereby the hydroxyl groups of the polyvinyl alcohol and the epoxy groups on the silane moieties react to form ether bonds, with which the residual silica hydroxyl groups on the surface of the particles are almost or almost completely covered.

The porous inorganic particles used herein are, for example, silica gel, hydroxyapatite, alumina, alumina silica, titania, diatomaceous earth, silicate glass, alumino silicate, clay kaolin, talc, zeolite and the like. It is also possible to use glass beads which are covered with microparticulate silica gel. The particles may be natural or man-made and is available in spherical and irregular particulate forms. The particles, preferably silica gel, have generally an average particle diameter of about 1 to about 1000 microns, a surface area of about 1 to about 800 square meters per gram and an average pore size of about 10 to about 4000 Angstrom units, preferably they have an average particle diameter of about 2 to about 300 microns, a surface area of about 50 to about 500 square meters per gram and an average pore size of about 20 to about 2000 Angstrom units. The inorganic particles may be used direct, preferably before use they are washed with mineral acid such as hydrochloric acid and then dried under reduced pressure at 60° to 200° C. or only dried at 80° to 400° C.

The organic silane compound used herein is, for example, the compound having the following general formula:

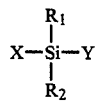

in which $R_1$ is epoxy group, $R_2$ is a member selected from the group consisting of epoxy, methoxy, ethoxy, methyl and ethyl groups and halogen atom, X is a member selected from the group consisting of methoxy, ethoxy, methyl and ethyl groups and halogen atom, and Y is a member selected from the group consisting of methoxy and ethoxy groups and halogen atom. Concretely as typical silane compound, γ-glycidoxypropyl trimethoxysilane, γ-glycidoxypropyl triethoxysilane, γ-glycidoxypropyl monomethyl dichlorosilane, γ-glycidoxypropyl dimethyl monochlorosilane, 3,4-epoxybutane monomethyl dichlorosilane, 3,4-epoxybutane triethoxysilane or di-γ-glycidoxypropyl dichlorosilane is examplified.

In the reaction of the porous inorganic particles with the organic silane compound, it is desirable to select conditions which avoid the decomposition of the silane compound as well known and to bind chemically the silane compound to the hydroxyl groups in existence of the surface of the inorganic particles as much as possible. In this case, it is necessary to protect the epoxy groups on the silane compound. Accordingly as reaction solvent, alcohol, ether, hydrocarbon or watery solvent is used, which does not denaturalize the silane compound, and the reaction is carried out in the solvent at the temperature between about 10° and 200° C. For example, in the case which select silica gel as the inorganic particles, it can be assumed that Si—O—Si bonds is formed by the isolation reaction of HX of the hydroxyl groups on the silica gel and the silane compound, in which HX is HCl, $CH_3OH$ or $CH_3CH_2OH$.

When the polyvinyl alcohol used herein has an average molecular weight of about 100 to about 200000, it may be in any one of perfect saponificated type (a saponification degree of more than 98 mol %), quasi-perfect saponificated type is saponification degree of 95 to 99 mol %) and partial saponificated type (a saponification degree of 70 to 95 mol %). Even if the polyvinyl alcohol has a saponification degree of less than 70 mol % and contains some polyvinyl acetate, it is available for the invention when it has some hydroxyl functional groups and thus can be bound chemically to the surface of the inorganic particles. It it contains some polyvinyl acetate, the acetyl groups thereof will be removed by alkali treatment after the final binding. The polymerization degree of the polyvinyl alcohol may be about 3 to 4600 corresponding to the molecular weight thereof, which is either one of uniform or coexistence of several degrees of polymerization. It is possible to use polyvinyl alcohol which is mixed with poly o-hydroxystyrene or methylol derivatives thereof, polyoxymethylene, polyethylene glycol having a polymerization degree of 10 or more and/or polysaccharide composed of four or more moleculars of monosaccharide such as dextran and pulran, which have a similar covering ability. As commercially available polyvinyl alcohol, some of "PVA" (Kurare Co.), "Gosenol" (Nippon Gosei Kagaku Co.) or the like is illusrated. Since the polyvinyl alcohol is excellent in compatibility with human body and the like, it may well be that the support of the invention will be used for the fields of biochemistry in the future.

In order to bind the particles with polyvinyl alcohol, as available solvent, dimethyl ether, dioxane, 1,2-dichloroethane, 1,1,1-trichloroethane, N,N-dimethyl formamide, dimethylsulfoxide or the like is not only illustrated, but also aliphatic or aromatic ethers, ketone, esters, N-substituted amides, sulfoxides or aqueous solvents may be used, which are inactive against the silane compound and polyvinyl alcohol. As available reactive catalyst, inorganic acid such as hydrochloric, sulfuric and phosphoric acids, Lewis salt such as boron trifluoride, boron trifluoride etherate and diboron tetrafluoride, or metal halogenide such as tin chloride($SnCl_2$, $SnCl_4$) and titanium tetrachloride is examplified. In the treatment, the silylated inorganic particles and polyvinyl alcohol may be stirred in the inert or water-containing solvent with the reactive catalyst for suitable temperature and time.

The surface of the support according to the invention, for example, the surface of the silica gel bound chemically with polyvinyl alcohol is almost or almost completely covered with alcoholic hydroxyl groups. By utilizing these functional groups, it is also possible to decorate chemically the support with octadecyl, octyl, n-butyl or ion-exchange group or the like, for example, after the chlorination. Alternatively, if the octadecyl, octyl, n-butyl or ion-exchange group is partially and additionally joined to polyvinyl alcohol beforehand, it is possible to bind the thus obtained polyvinyl alcohol derivative with the silane moieties.

Figure 2:
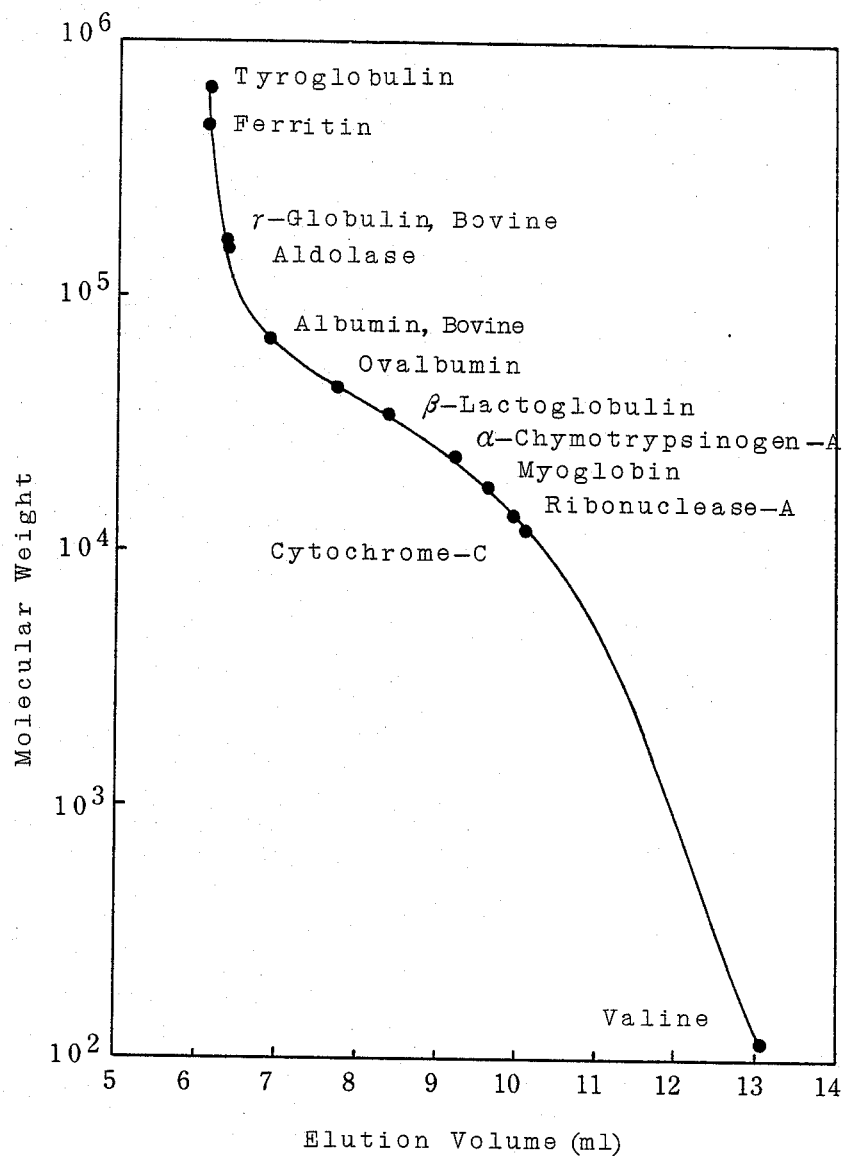
FIG. 2 is a calibration curve which is obtained from a chromatogram showing resolution of the standard protein sample at the flow rate of 1.0 mm/min. using the column mentioned above.
Figure 3A:
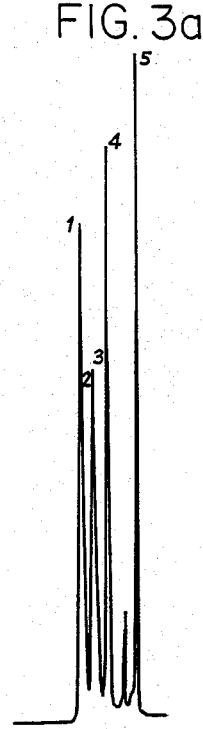
FIGS. 3(1) and (2) are a separation chromatogram at the pH of 12.0 and a chromatogram after the continuous flowing of 300 hours, respectively.
Figure 3B:
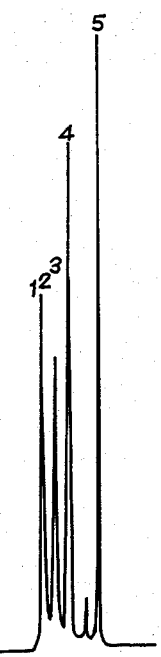

It is assumed that the residual hydroxyl groups on the surface of the support are almost or almost completely covered because the hydroxyl groups of the polyvinyl alcohol used herein are reacted with the epoxy groups on the silane moieties by ringopening to form ether bonds, after the silyl hydroxyl groups of the porous particles is reacted with the silane compound to form Si—O—Si bonds. As the surface of the support according to the invention is almost or almost completely covered with the crosslinked moieties or the derivative thereof, the hydrophobic interaction of the support and solute is reduced extremely. Accordingly, using the support, molecular sieve effect generates in watery mobile phase and amino acids and/or proteins can be separated more finely by gel filtration, as illustrated in FIGS. 1 and 2. When the hydrophobic interaction is reduced extremely, dissolution besides alkali which is a property of the inorganic particles i.e. silica gel disappear, as illustrated in FIG. 3, and the support can be employed in alkali range less than pH 13 over a long time. Also, by decorating the support of the invention chemically with the octadecyl, octyl, n-butyl or ion-exchange group, the application region of the support for separating solute expands to a higher pH range, and the improved analysis and/or separation which is beyond the range of possibilites by the conventional material is accomplished by the chemically decorated support.

The invention will be understood more readily with reference to the following example, and variations may be made by one skilld in the art without departing from the spirit and scope of the invention.

EXAMPLE

To 200 ml of toluene solution including 10% of γ-glycidoxypropyl trimethoxysilane, 10 grams of porous silica gel with an average particle diameter of 2 to 10 microns and an average pore size of 120 Angstrom units were added and reacted with stirring at about 90° C. for 20 hours. The reactant solution was decanted and washed with 1 lit. of toluene twice and then heated to 35° C. and dried on a reduced pressure drier.

Subsequently, 1 part of the total of the silylated silica gel and 0.5 part of polyvinyl alcohol (perfect saponificated type, a saponification degree of more than 98%, a polymerization degree of 1000 to 1500) were suspended in 20 parts of 1,4-dioxane, and 0.1 part of boron trifluoride etherate was added with stirring and then reacted for 30 hours at room temperature. The reactant was filtered at reduced pressure, washed with 500 parts of distilled water having 60° C. twice and dried in a reduced pressure drier which was heated to 35° C. By this treatment, the weight increment of the silica gel was 8 weight %.

The silica gel support thus obtained was filled out in a stainless steel column with 8 mm in diameter and 300 mm in length by the wet method using distilled water as a slurry. By utilizing this column, elution behaviors of several water-soluble proteins were investigated under the following conditions:

MEASUREMENT CONDITIONS:
 Mobile Phase: 0.1M Phosphate buffer containing 0.2M NaCl (pH=7.0)
 Detector: UV 220nm(Auf×0.32)
 Chart Speed: 2.0 mm/min.
 Sample: 1. Tyroglobulin; 2. Albumin, Bovine; 3. β-Lactoglobulin; 4. Cytochrome-C; 5. Valine.

From this result, it was possible to perform a separation of proteins by gel filtration chromatography (GFC) because the peak was very sharp at each flow rate of the sample solution, as shown in FIG. 1.

By the column mentioned above, a separation chromatogram of standard proteins was performed at a flow rate of 1.0 mm/min. of the sample solution under the same conditions as above. When a calibration curve was drawn from the elution volume and the molecular weight of each protein, it was shown in FIG. 2. It was obvious that a separation of each one of the compositions was remarkably excellent.

FIG. 3 was a separation chromatogram employing the column mentioned above, which was performed under the following alkali conditions:
 Mobile Phase: 0.1M Phosphate buffer containing 0.2M NaCl (pH=12.0)
 Flow Rate: 1.0 ml/min.
 Detector: UV 220nm(Auf×0.32)
 Chart Speed: 2.0 mm/min.
 Sample: 1. Tyroglobulin: 2. Albumin, Bovine; 3. β-Lactoglobulin; 4. Cytochrome-C; 5. Valine.

In FIG. 3(1), by the support according to the invention, it was obvious that the peak was sharp at pH 12.0, and the support showed the similar tendency after the continuous flowing for 300 hours, as shown in FIG. 3(2).

COMPARISON

To 200 ml of toluene solution including 10% of γ-glycidoxypropyl trimethoxysilane, 10 grams of porous silica gel with an average particle diameter of 2 to 10 microns and an average pore size of 120 Angstrom units were added and reacted with stirring at about 90° C. for 20 hours. The reactant solution was decanted, washed with 1 lit. of toluene twice and then heated to 35° C. and dried in a reduced pressure drier. 100 ml of 6N hydrochloric acid solution were added to the total of the silylated silica gel and heating and reflexing were performed for 30 hours. The reactant solution was decanted, washed to a pH of more than 5 with 1% ammonium hydrogencarbonate aqueous solution, and further washed with 2 lit. of distilled water. The reactant was heated to 35° C. and dried in a reduced pressure drier.

Figure 4A:
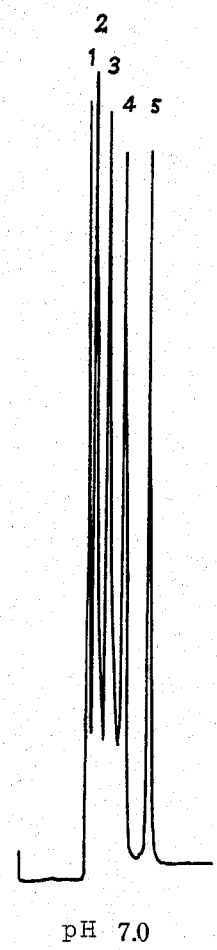
FIGS. 4(1) and (2) are separation chromatograms which is obtained from a column packed with a conventional support.
Figure 4B:
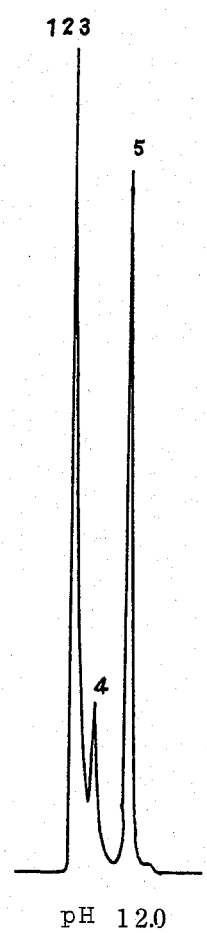

In the case of the COMPARISON, the silylated silica gel was not chemically bound with polyvinyl alcohol, and the slurry filling procedure of EXAMPLE was repeated. Elution behaviors of several water-soluble proteins were investigated under the same conditions as EXAMPLE at a flow rate of 10 ml/min. and at room temperature. In this case, it was only possible to perform a GFC separation of the proteins on a mobile phase of pH 7.0, as shown in FIG. 4(1). However, as shown in FIG. 4(2), it was impossible to measure a normal chromatography after the start of about 30 min. because the silica gel began to be dissolved at pH 12.0. After the start of 300 hours, the silica gel in the column was almost dissolved, thus it was completely impossible to obtain a sure chromatography.

Comparing durability of the support of COMPARISON with that of EXAMPLE, the result was as follows:

| mobile phase | Support of EXAMPLE | Support of COMPARISON |
|---|---|---|
| pH 7.0 | Effective for 300 hours | Effective for 300 hours |
| pH 10.0 | Effective for 300 hours | Not Effective after Start of 1 hrs. |
| pH 12.0 | Effective for 300 hours | Not Effective |
| pH 13.0 | Effective | Not Effective |

| mobile phase | Support of EXAMPLE for 300 hours | Support of COMPARISON |
| --- | --- | --- |

From the table mentioned above, it was obvious that the support of EXAMPLE had alkali-resisting ability which was not accomplished by the conventional support i.e. the support of COMPARISON.

What is claimed is:

1. A packing material for analysis and/or separation of hydrophilic compounds comprising the chemically bound, crosslinked reaction product of porous inorganic particles having an average particle diameter of about 1 to about 1000 microns, a surface area of about 1 to about 800 square meters per gram and an average pore size of about 10 to about 4000 Angstrom units, with an organic silane compound having epoxy groups on the surface of the particles, and then with polyvinyl alcohol having an average molecular weight of about 100 to about 200000, in which the hydroxyl groups of the polyvinyl alcohol and the epoxy groups on the silane moieties react to form ether bonds, whereby the residual silica hydroxyl groups on the surface of the support are almost completely covered.

2. A packing material as set forth in claim 1, in which the porous inorganic particles have an average particle diameter of about 2 to about 300 microns, a surface area of about 50 to about 500 square meters per gram and an average pore size of about 20 to about 2000 Angstrom units.

3. A packing material as set forth in claim 1 or 2, in which the porous particles are microparticulate silica gel.

4. A packing material as set forth in claim 1, in which the organic silane compound is the following general formula:

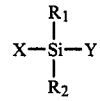

in which $R_1$ is epoxy group, $R_2$ is a member selected from the group consisting of epoxy, methoxy, ethoxy, methyl and ethyl groups and halogen atom, X is a member selected from the group consisting of methoxy, ethoxy, methyl and ethyl groups and halogen atom, and Y is a member selected from the group consisting of methoxy and ethoxy groups and halogen atom.

5. A packing material as set forth in claim 4, in which the organic silane compound is γ-glycidoxypropyl trimethoxysilane.

6. A packing material as set forth in claim 1, in which the polyvinyl alcohol has an average molecular weight about 100 to about 200000 of which uniform and nonuniform degrees of polymerization coexist.

7. A packing material as set forth in claim 6, in which polyvinyl alcohol is mixed with a member selected from the group consisting of poly o-hydroxystyrene and methylol derivatives thereof, polyoxymethylene, polyethylene glycol having a polymerization degree of 10 or more, and polysaccharide composed of four or more moleculars of monosaccharide.

8. A method of making a packing material for analysis and/or separation of hydrophilic compounds, which comprises reacting porous inorganic particles having an average particle diameter of about 1 to about 1000 microns, a surface area of about 1 to about 800 square meters per gram and an average pore size of about 10 to about 4000 Angstrom units, with an organic silane compound having epoxy group, whereby the silane compound is bound chemically to the surface of the particles without ring-opening of the epoxy groups, and then reacting the resultant product with polyvinyl alcohol having an average molecular weight of about 100 to about 200000, whereby the hydroxyl groups of the polyvinyl alcohol and the epoxy groups on the silane moieties react to form ether bonds, which cover almost completely the residual silica hydroxyl groups on the surface of the support.

9. A chromatographic column suitable for high pressure liquid chromatography packed with the material set forth in claim 1.

* * * * *

UNITED STATES PATENT AND TRADEMARK OFFICE
CERTIFICATE OF CORRECTION

PATENT NO. : 4,828,695

DATED : May 9, 1989

INVENTOR(S) : Ryuji Yamamura et al

It is certified that error appears in the above-identified patent and that said Letters Patent is hereby corrected as shown below:

Col. 8, line 20 change "polymerication" to --polymerization--.

Signed and Sealed this

Fifth Day of December, 1989

Attest:

JEFFREY M. SAMUELS

*Attesting Officer*     *Acting Commissioner of Patents and Trademarks*